US007488145B2

(12) United States Patent
Watanabe et al.

(10) Patent No.: US 7,488,145 B2
(45) Date of Patent: Feb. 10, 2009

(54) METHOD FOR MANUFACTURING A DOUGHNUT-SHAPED GLASS SUBSTRATE

(75) Inventors: Yuichi Watanabe, Toyohashi (JP); Masami Kaneko, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 163 days.

(21) Appl. No.: 11/336,964

(22) Filed: Jan. 23, 2006

(65) Prior Publication Data

US 2006/0182504 A1 Aug. 17, 2006

(30) Foreign Application Priority Data

Jan. 25, 2005 (JP) ............................ 2005-016694

(51) Int. Cl.
*B23B 35/00* (2006.01)

(52) U.S. Cl. .......................... 408/1 R; 408/44; 408/70; 408/87; 279/3; 451/41

(58) Field of Classification Search .................. 408/37, 408/39, 44, 1 R, 36, 40, 50, 34, 35, 31, 42, 408/43, 62, 69, 70, 87, 204, 703; 451/44, 451/65, 5, 41; 125/20; 279/3

See application file for complete search history.

(56) References Cited

U.S. PATENT DOCUMENTS 1,825,277 A * 9/1931 Lytle .......................... 408/1 R
2,329,922 A * 9/1943 McCormick, Jr. ............ 65/269
2,413,084 A * 12/1946 Sommer et al. ............... 408/59

(Continued)

FOREIGN PATENT DOCUMENTS

JP 54131191 A * 10/1979

(Continued)

OTHER PUBLICATIONS

U.S. Appl. No. 11/271,787, filed Nov. 14, 2005, Osamu Miyahara et al.

(Continued)

*Primary Examiner*—Daniel W Howell
(74) *Attorney, Agent, or Firm*—Oblon, Spivak, McClelland, Maier & Neustadt, P.C.

(57) ABSTRACT

A method for manufacturing a doughnut-shaped glass substrate by use of a glass substrate manufacturing apparatus, the glass substrate manufacturing apparatus comprising a work stage, three drilling machines and a conveying device capable of moving the work stage, comprising fixing a glass sheet on the work stage; moving the glass sheet to a position just above the core drill of the first drilling machine by use of the conveying device; partially drilling the glass sheet from downward by use of the core drill of the first drilling machine; moving the glass sheet to a position just under the core drill of the second drilling machine by use of the conveying device; forming the inner circular hole in the doughnut-shaped glass substrate by drilling the partially drilled portion from upward by use of the core drill of the second drilling machine; moving the glass sheet to a position just under the core drill of the third drilling machine by use of the conveying device; and separating the doughnut-shaped glass substrate from the glass sheet by drilling the glass sheet from upward by use of the core drill of the third drilling machine.

2 Claims, 3 Drawing Sheets

U.S. PATENT DOCUMENTS

| | | | | | |
|---|---|---|---|---|---|
| 2,638,084 | A | * | 5/1953 | McLaughlin | 408/58 |
| 2,941,338 | A | * | 6/1960 | Santschi | 451/195 |
| 2,996,061 | A | * | 8/1961 | Miller | 408/59 |
| 3,003,493 | A | * | 10/1961 | Miller | 408/59 |
| 3,461,615 | A | * | 8/1969 | Welker et al. | 451/195 |
| 3,710,516 | A | * | 1/1973 | Kelly | 451/41 |
| 3,813,820 | A | * | 6/1974 | Highberg et al. | 451/262 |
| 4,541,758 | A | * | 9/1985 | Frank et al. | 408/1 R |
| 4,579,483 | A | * | 4/1986 | Padovani | 408/39 |
| 4,730,420 | A | * | 3/1988 | Stratmann et al. | 451/41 |
| 4,872,289 | A | * | 10/1989 | Yukawa et al. | 451/67 |
| 5,087,481 | A | | 2/1992 | Chen et al. | |
| 5,116,169 | A | * | 5/1992 | Loy | 408/39 |
| 5,152,641 | A | * | 10/1992 | Overmyer et al. | 408/1 R |
| 5,341,606 | A | * | 8/1994 | Hirabayashi | 451/41 |
| 5,538,579 | A | | 7/1996 | Ishimura et al. | |
| 5,569,518 | A | | 10/1996 | Hayashi | |
| 5,871,654 | A | | 2/1999 | Mannami et al. | |
| 5,900,296 | A | | 5/1999 | Hayashi et al. | |
| 5,926,352 | A | | 7/1999 | Murayama et al. | |
| 6,363,599 | B1 | | 4/2002 | Bajorek | |
| 6,664,503 | B1 | | 12/2003 | Hsieh et al. | |
| 6,718,612 | B2 | | 4/2004 | Bajorek | |
| 6,795,274 | B1 | | 9/2004 | Hsieh et al. | |
| 6,829,910 | B1 | | 12/2004 | Hsieh et al. | |
| 6,863,947 | B2 | | 3/2005 | Kaneko | |
| 6,949,485 | B2 | | 9/2005 | Nakashima et al. | |
| 2001/0049031 | A1 | | 12/2001 | Bajorek et al. | |
| 2002/0182019 | A1 | * | 12/2002 | Miao | 408/37 |
| 2003/0175471 | A1 | | 9/2003 | Kaneko | |
| 2003/0179494 | A1 | | 9/2003 | Kaneko | |
| 2005/0142321 | A1 | | 6/2005 | Miyahara et al. | |

FOREIGN PATENT DOCUMENTS

| | | | | |
|---|---|---|---|---|
| JP | 56-045834 | | | 4/1981 |
| JP | 63-028527 | | | 8/1988 |
| JP | 6-16434 | | | 3/1994 |
| JP | 7-40747 | | | 7/1995 |
| JP | 11-149669 | | | 6/1999 |
| JP | 2000158395 | A | * | 6/2000 |
| JP | 2000-229319 | | | 8/2000 |
| JP | 2000-319030 | | | 11/2000 |
| JP | 2001071323 | A | * | 3/2001 |
| JP | 2004284911 | A | * | 10/2004 |
| JP | 2004351655 | A | * | 12/2004 |

OTHER PUBLICATIONS

U.S. Appl. No. 11/274,303, filed Nov. 16, 2005, Osamu Miyahara et al.
U.S. Appl. No. 11/201,386, filed Aug. 11, 2005, Osamu Miyahara et al.
U.S. Appl. No. 11/275,160, filed Oct. 25, 2005, Masami Kaneko.
U.S. Appl. No. 09/391,139, filed Sep. 7, 1999, John Hsieh et al.

* cited by examiner

METHOD FOR MANUFACTURING A DOUGHNUT-SHAPED GLASS SUBSTRATE

The present invention relates to a method for manufacturing a doughnut-shaped glass substrate, which is used as a substrate for magnetic hard disks applicable to mainly information storage media in computers, various information storage devices and the like.

As computers, various information storage devices and the like have been widely applied, data to be prepared or recorded have had larger capacities and have been more quickly processed for recent years. The trend in the development of magnetic hard disks as information storage media capable of quickly reading/writing a large volume of information has been toward the use of glass substrates, which are excellent in hardness and smoothness, in place of substrates comprising aluminum metal, which have been used. In particular, glass sheets, which are formed by a floating process, are excellent not only in flatness and smoothness but also in costs because of being fitted to large-scale production.

As the method for machining a glass sheet to prepare a doughnut-shaped substrate, various methods have been adopted. The various methods have been broadly and typically classified into a method for forming a hole in a glass sheet by use of a core drill and a method for cutting a glass sheet by use of a cutter, such as a wheel tip. The method for forming a hole by use of a core drill has a problem of high equipment cost, although obtaining good machining precision. On the other hand, the method for cutting a glass sheet by use of, e.g., a wheel tip has a problem that some measures are needed to form an inner circular hole, although being advantageous in that the equipment cost is relatively low. For this reason, it has been most common to separate a doughnut-shaped substrate from a glass sheet by a cutting method, followed by calculating the center of the doughnut-shaped substrate based on the outer peripheral shape thus cut, and by using a core drill to form an inner circular hole based on the calculated center.

However, a cross-section of the outer peripheral portion of a glass substrate cut by the latter method is not formed in a shape perpendicular to a glass substrate surface in many cases. Additionally, it is difficult to form the planar shape of the outer peripheral portion in a perfect circle. When the center of the glass substrate is calculated based on the outer peripheral shape, the center is calculated with an error being contained therein. When an inner circular hole is formed based on the calculated center with an error being contained therein, it is necessary to increase a machining allowance (amount of machining) in chamfering (chamfering an edge portion) and sizing for final adjustment in dimensions as subsequent processing since the outer periphery and the inner circular hole of the glass substrate in a doughnut-shape are inferior in concentricity.

On the other hand, JP-A-2000-319030 has disclosed a method for manufacturing a glass substrate for magnetic hard disks, which comprises a step for forming, in a glass sheet, a portion serving as an inner circular hole by a core drill, a step for conforming the center of the inner circular hole to the center of the scribing shaft of a scriber, a step for forming an outer peripheral score line while pressing a cutter against the glass sheet, and a step for applying a bending moment along the outer peripheral score line to cut the glass sheet. According to this publication, the method described in this publication can obtain a glass substrate having an excellent concentricity, thereby to decrease the machining allowance in subsequent machining.

However, the machining precision of an outer peripheral portion machined by the cutting process is inferior to that of an inner circular hole in the method described in this publication. The operations are complicated since the step for forming, in a glass sheet, a portion serving as an inner circular hole by a core drill, and the step for machining an outer peripheral portion by the cutting process, i.e., the step for forming an outer peripheral score line in the glass sheet by the cutter of a scriber and the step for applying a bending moment along the outer peripheral score line to cut the glass sheet are performed by different machines in the method described in this publication. Additionally, the method described in this publication is inferior in terms of productivity of doughnut-shaped glass substrates since it takes much time to perform these operations.

There exists an apparatus, which forms an inner circular hole in a glass sheet and separates a doughnut-shaped glass substrate from the glass sheet by a drilling operation using a core drill. However, this apparatus has a complicated structure because of being configured to perform not only a first drilling operation for the purpose of forming an inner circular hole but also a second drilling operation for the purpose of separating a doughnut-shaped glass substrate from the glass sheet at a single portion. Additionally, this apparatus is inferior in terms of productivity since only a single doughnut-shaped glass substrate can be manufactured at one time.

In order to prevent a glass sheet from being chipped (cracked) when forming an inner circular hole by a first drilling operation using a core drill, a method has been proposed which interrupts the first drilling operation by the core drill during drilling without forming the inner circular hole so as to pass through the glass sheet by the core drill at one time, and performs a second drilling operation of the remaining portion of the hole from the opposite side of the glass sheet to form the hole so as to pass through the glass sheet by the core drill. This apparatus includes a system for inverting a work station in order to perform such operations. However, the provision of such a system makes the structure of the apparatus more complicated and further reduces the productivity of a doughnut-shaped glass substrate.

It is an object of the present invention to solve the problems of the prior art stated above and to provide a method for manufacturing a doughnut-shaped glass substrate, which is capable of performing both of formation of an inner circular hole in a doughnut-shaped glass substrate and separation of the doughnut-shaped glass substrate from the glass sheet with high machining precision, and of being excellent in productivity.

In order to attain the object, the present invention provides a method for machining a glass sheet to manufacture a doughnut-shaped glass substrate by use of a glass substrate manufacturing apparatus, the glass substrate manufacturing apparatus comprising a work stage capable of fixing a glass sheet thereon; three drilling machines, each of the three drilling machines including a core drill; and a conveying device capable of moving the work stage;

wherein the respective three drilling machines comprise a first drilling machine having a first core drill mounted thereon so as to direct a blade edge vertically upward, the core drill of the first drilling machine having a blade diameter corresponding to a diameter of an inner circular hole to form in a doughnut-shaped glass sheet; a second drilling machine having a core drill mounted thereon so as to direct a blade edge vertically downward, the core drill of the second drilling machine having a blade diameter corresponding to the diameter of the inner circular hole to form in the doughnut-shaped glass sheet; and a third drilling machine having a core drill mounted thereon so as to direct a blade edge vertically downward, the core drill of the third drilling machine having a blade diameter corresponding to an outer diameter of the doughnut-shaped glass sheet;

comprising:

fixing a glass sheet on the work stage;

moving the glass sheet to a position just above the core drill of the first drilling machine by use of the conveying device;

partially drilling the glass sheet from downward by use of the core drill of the first drilling machine;

moving the glass sheet to a position just under the core drill of the second drilling machine by use of the conveying device;

forming the inner circular hole in the doughnut-shaped glass substrate by drilling the partially drilled portion from upward by use of the core drill of the second drilling machine;

moving the glass sheet to a position just under the core drill of the third drilling machine by use of the conveying device; and separating the doughnut-shaped glass substrate from the glass sheet by drilling the glass sheet from upward by use of the core drill of the third drilling machine.

In accordance with the present invention, it is possible to perform both of formation of an inner circular hole in a doughnut-shaped glass substrate and separation of the doughnut-shaped glass substrate from the glass sheet with high machining precision. The method according to the present invention is excellent in productivity since a plurality of glass sheets can be processed at one time.

Figure 3:
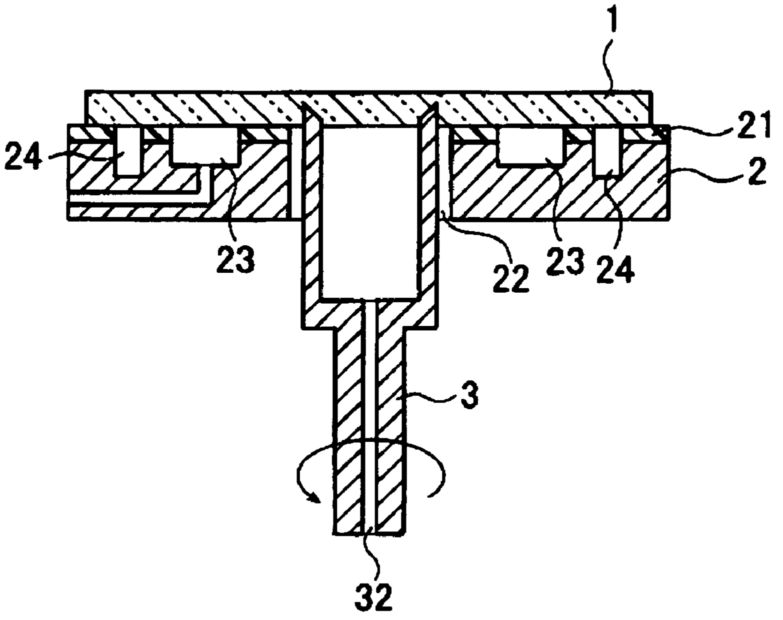
FIG. 3 is a view similar to FIG. 2, showing how the glass sheet is drilled by the core drill of the first drilling machine.
Figure 5:
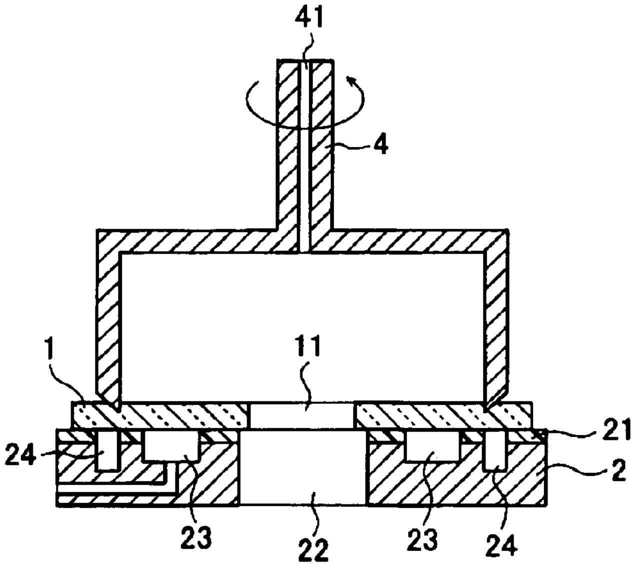
Figure 6A:
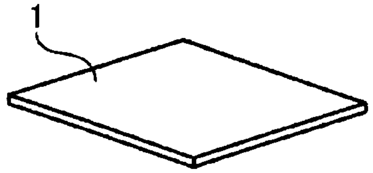
Figure 6B:
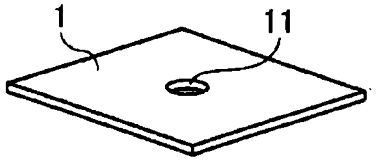
Figure 6C:
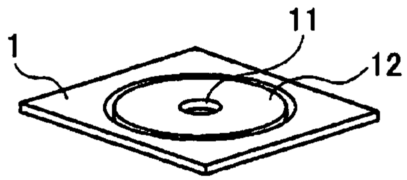
Figure 6D:
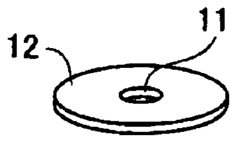

FIG. 5 is a view similar to FIG. 3, although showing a third drilling machine; and FIGS. 6A to 6D are the states of the glass sheet in respective steps in a method for manufacturing a doughnut-shaped glass substrate, according to the present invention, wherein FIG. 6A shows the state of the glass sheet before drilling by the core drill of the first drilling machine, FIG. 6B shows the state of the glass sheet with an inner circular hole formed for a doughnut-shaped glass substrate, FIG. 6C shows that the doughnut-shaped glass substrate has been separated from the glass sheet, and FIG. 6D shows the doughnut-shaped glass substrate manufactured by the method according to the present invention.

Now, the method according to the present invention will be described in detail, referring to a preferred embodiment shown in the accompanying drawings. The method according to the present invention may be implemented, utilizing a glass substrate manufacturing apparatus, which comprises a work stage capable of fixing a glass sheet thereon, three drilling machines, each of the drilling machines including a core drill, and a conveying device for moving the work stage.

Figure 1:
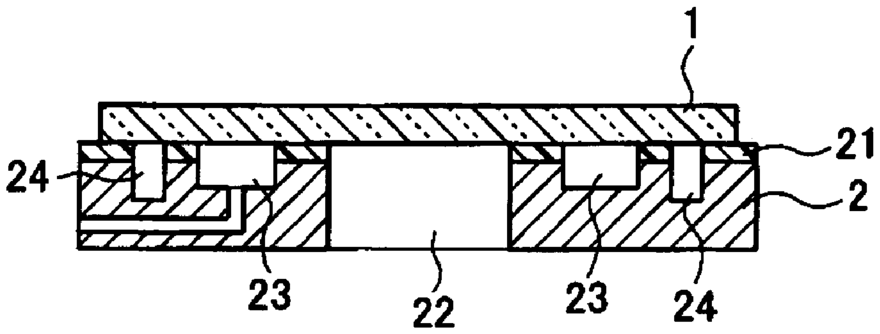
FIG. 1 is a schematic view explaining a work stage, wherein the work stage with a glass sheet fixed thereon is shown in a cross-sectional view.

FIG. 1 is a schematic view explaining a work stage 2, wherein the work stage with a glass sheet 1 fixed thereon is shown in a cross-sectional view. The work stage 2 is not limited to have a specific planar shape. The work stage may be formed in a circular planar shape, a rectangular planar shape or another shape.

The work stage 2 normally has a surface for fixing the glass sheet 1 (hereinbelow, referred to as the glass sheet fixing surface) formed with a buffer layer 21, which comprises, e.g., a coating of fluororesin, a coating of urethane resin, or another plastic film, such as a protective film of polyvinyl chloride, which is adequately soft and has an absorptive function. The provision of the buffer layer cannot only prevent a glass cullet from scratching the glass sheet and but also increase the fixing force of the glass sheet 1 to the glass sheet fixing surface.

Figure 2:
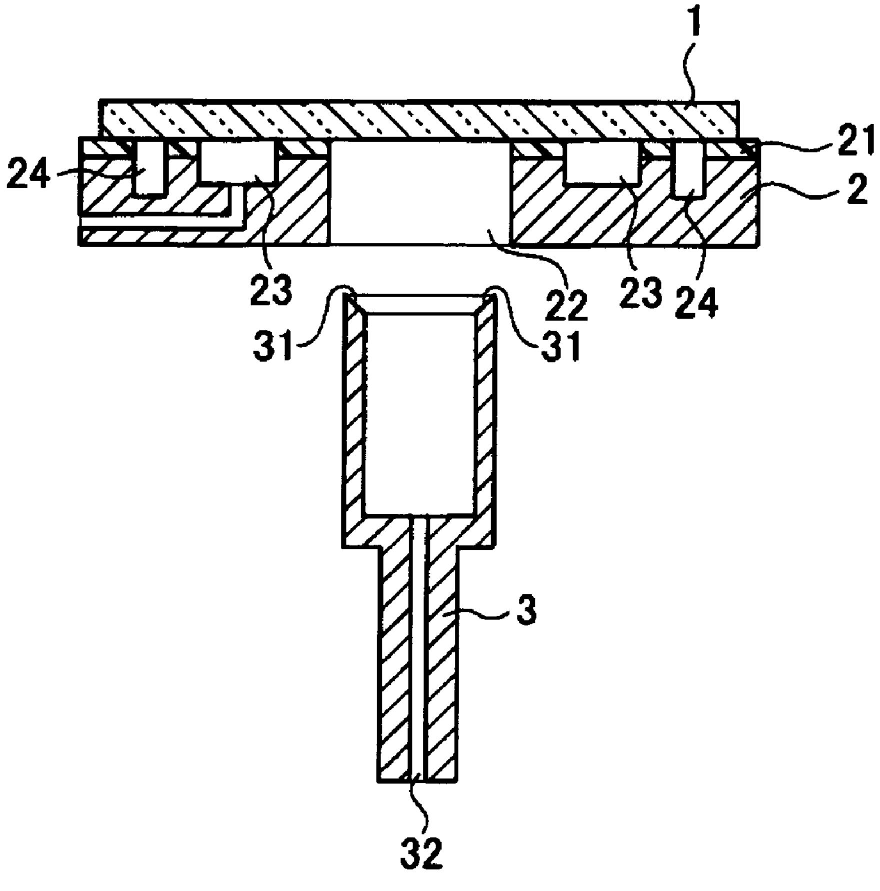
FIG. 2 is a schematic view explaining a first drilling machine, wherein a first core drill of the first drilling machine and a work stage with a glass sheet fixed thereon are shown in a cross-sectional view.
Figure 4:
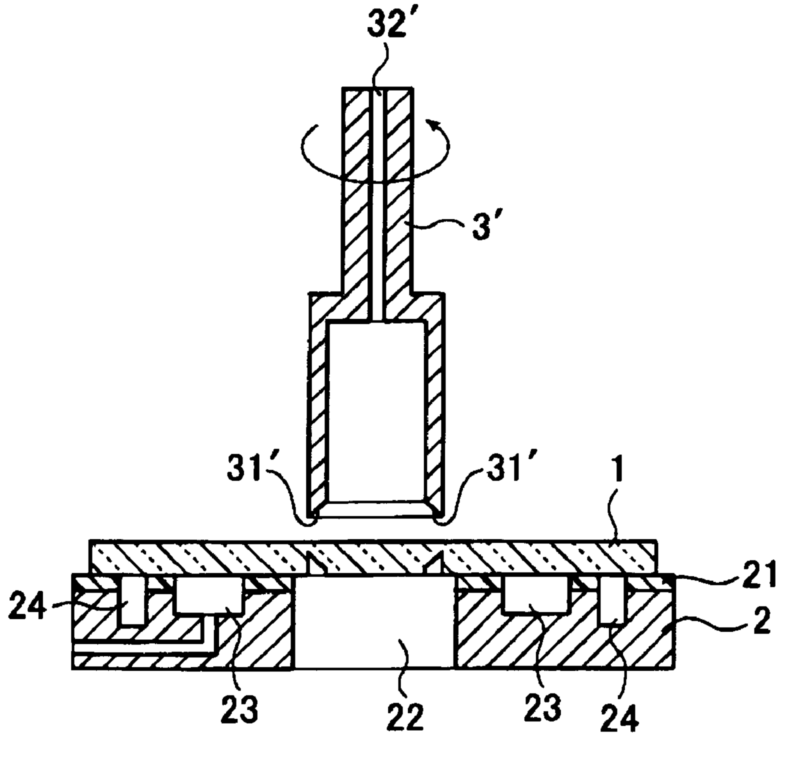
FIG. 4 is a view similar to FIG. 2, although showing a second drilling machine.

The work stage 2 has a through hole 22 formed in a central portion thereof. The through hole 22 serves as a clearance when drilling the glass sheet 1 by core drills for the purpose of forming an inner circular hole in a doughnut-shaped glass substrate, so that when drilling the glass sheet 1 from downward as shown in FIG. 2, a core drill 3 of a first drilling machine can proceed toward the glass sheet 1, and that when a core drill 3' of a second drilling machine drills the glass sheet 1 from upward to complete the formation of the inner circular hole of the doughnut-shaped glass substrate as shown in FIG. 4, a blade edge 31' of the core drill 3' of the second drilling machine, which has passed through the glass sheet, can be prevented from being brought into contact with the work stage 2. The glass sheet fixing surface of the work stage 2 has annular grooves 23 and 24 formed therein. An annular groove 23 is connected to a vacuum pump (not shown) and serves as a suction groove for fixing the glass sheet 1 on the work stage 2 by use of a suction force caused by vacuum suction from the vacuum pump. The annular groove 24 serves as a clearance so that a blade edge of a core drill 4 of the third drilling machine, which has passed through the glass sheet 1, can be prevented from being brought into contact with the work stage 2 when drilling the glass sheet by the core drill 4 of the third drilling machine for the purpose of separating the doughnut-shaped glass substrate from the glass sheet as shown in FIG. 5.

The glass substrate manufacturing apparatus, which is applicable to the method according to the present invention, normally has the work stage as shown in FIG. 1 disposed at plural positions therein.

The glass substrate manufacturing apparatus, which is applicable to the method according to the present invention, includes the three drilling machines, each of which comprises the core drill for drilling the glass sheet 1. The core drill of the first drilling machine has a blade diameter corresponding to the diameter of the inner circular hole of the doughnut-shaped glass substrate. The first drilling machine is mounted so as to have a blade edge of the core drill directed vertically upward since the first drilling machine drills the glass sheet 1 from downward.

The core drill of the second drilling machine has a blade diameter corresponding to the diameter of the inner circular hole of the doughnut-shaped glass substrate. However, the second drilling machine is mounted so as to have the blade edge of the core drill directed vertically downward since the second drilling machine drills the glass sheet 1 from upward. The core drill of the third drilling machine has a blade diameter corresponding to an outer diameter of the doughnut-shaped glass substrate. The third drilling machine is mounted so as to have the blade edge of the core drill directed vertically downward since the third drilling machine drills the glass sheet 1 from upward.

FIG. 2 is a schematic view explaining the first drilling machine, wherein the core drill of the first drilling machine and the work stage with the glass sheet fixed thereon are shown in a cross-sectional view. The core drill 3 has a blade edge 31 formed in a cup shape at a leading edge thereof so as to have a blade diameter corresponding to the diameter of the inner circular hole of a doughnut-shaped glass substrate to manufacture. The blade edge 31 of the core drill is formed with an abrasive grain layer, which comprises desired abrasive grains fixed to the blade edge by a metal bond, a resin bond, electrodeposition or the like. The abrasive grains are selected from diamond, SiC, $Al_2O_3$, $ZrO_2$, $Si_3N_4$, CB, CN and the like, which are normally utilized to grind a glass sheet.

As shown in FIG. 3, the glass sheet 1 starts to be drilled when the core drill 3 is upward moved so as to bring the blade edge into contact with the glass sheet 1 while the core drill is rotated about its shaft. At this time, a grinding fluid is discharged from a shaft center 32 of the core drill 3 to cool a hole drilling area and to wash away chips caused by drilling. The second drilling machine is configured in the same way as the first drilling machine with the core drill 3, except that the second drilling machine is disposed at a higher position than the glass sheet 1, having the blade edge 31' of the core drill 3' directed vertically downward. The third drilling machine is configured to be similar to the second drilling machine with the core drill 3', except that the third drilling machine has the blade diameter of the core drill corresponding to the outer diameter of a doughnut-shaped glass substrate.

In the glass substrate manufacturing apparatus applicable to the method according to the present invention, the drilling operations of a glass sheet by the respective drilling machines are carried out at different positions in the apparatus. In other words, the respective drilling machines are located at different positions in the apparatus. For this reason, the work station with a glass sheet fixed thereon needs to be moved among the drilling machines in order to drill the glass sheet by the respective drilling machines. The work stage is moved among the drilling machines by use of a conveying device.

The conveying device is not limited to have a specific structure as long as the work stage can be moved among the drilling machines with high positional accuracy. Specific examples of the conveying device are an index table and a conveyor belt. When the conveying device comprises an index table, the index table is formed in a circular shape and has a plurality of work stages disposed at intervals. The index table is intermittently rotated in a clockwise direction or a counterclockwise direction to move the work stages with a glass sheet fixed thereon among the drilling machines. When the conveying device comprises a belt conveyor, the belt conveyor has a plurality of work stages disposed thereon. The belt conveyor is intermittently moved in a longitudinal direction to move the work stages among the drilling machines.

The method according to the present invention may be carried out in the following procedure. First of all, a glass sheet 1 is put on a work stage 2 as shown in FIG. 1. FIGS. 6A to 6D show the states of the glass sheet in the respective steps of the method according to the present invention, FIG. 6A showing the glass, which has not been drilled by the core drills yet. As shown in FIG. 6A, the method according to the present invention mainly deals with a glass sheet, which has been cut out in a desired size from float plate glass. It should be noted that the method according to the present invention is not limited to deal with such a glass sheet and that the method according to the present invention may deal with a glass sheet having a desired shape as required.

The glass sheet 1 is fixed on the work stage 2 by a vacuum suction force given by the groove 23. The operation for putting the glass sheet 1 on the work stage 2 may be manually carried out or be mechanically carried out by use of a loading system, such as a robot hand.

The glass sheet 1, which has been fixed on the work stage 2, is moved to a position of the first drilling machine by the conveying device. Since the first drilling machine is mounted so as to have the blade edge of the core drill directed vertically upward in order to drill the glass sheet from downward as stated above, the glass sheet 1 fixed on the work stage 2 is moved to a position just above the core drill of the first drilling machine, speaking more specifically. FIG. 2 shows this state, wherein the glass sheet 1 fixed on the work stage 2 is located in the position just above the core drill 3 of the first drilling machine.

Next, the core drill 3 is moved upward, being rotated about its shaft, as shown in FIG. 3. When the blade edge is brought into contact with the glass sheet 1, the glass sheet 1 starts to be drilled. Since the blade edge of the core drill 3 has a blade diameter corresponding to the inner circular hole of a doughnut-shaped glass substrate, the inner circular hole of the doughnut-shaped glass substrate starts to be formed. At this time, the grinding fluid is discharged from the shaft center 32 of the core drill 3 to cool the hole drilling area and to wash away chips caused by drilling.

In the method according to the present invention, the glass sheet 1 is not entirely drilled at one time by the blade edge of the core drill 3, starting with the state shown in FIG. 3. Instead, the drilling operation is halted at a time when the glass sheet has been partially drilled, such as a time when the glass sheet 1 has been drilled by a depth of from about a half to about ⅔ of the thickness thereof. This is because if the glass sheet is entirely drilled at one time, the glass sheet is chipped (cracked) in a significant way.

Next, the glass sheet 1 fixed on the work stage 2 is moved to a position of the second drilling machine by the conveying device. Since the second drilling machine is mounted so as to have the blade edge of the core drill directed vertically downward in order to drill the glass sheet from upward as stated above, the glass sheet 1 fixed on the work stage 2 is moved to a position just under the core drill of the second drilling machine, speaking more specifically. FIG. 4 shows this state, wherein the glass sheet 1 fixed on the work stage 2 is located in the position just under the core drill 3' of the second drilling machine. As shown in FIG. 4, the blade edge 31' of the core drill 3' conforms to the portion partially drilled in the previous step for the glass sheet 1.

From the position shown in FIG. 4, the core drill 3' is moved downward, being rotated about its shaft, and the blade edge 31' of the core drill 3' is brought into contact with the glass sheet 1. Since the blade edge 31' of the core drill 3' conforms to the portion partially drilled in the previous step for the glass sheet 1, the remaining portion of the inner circular hole of the glass sheet 1 is drilled. At this time, the grinding fluid is discharged from a shaft center 32' of the core drill 3' to cool a hole drilling area and to wash away chips caused by drilling. By entirely drilling the glass sheet 1 by use of the blade edge 31' of the core drill 3', a portion as the inner circular hole of the doughnut-shaped glass substrate has been cut out from the glass sheet 1 with the result that the formation of the inner circular hole of the doughnut-shaped glass substrate has been completed. FIG. 6B shows the glass sheet 1, which has had the inner circular hole of the doughnut-shaped glass substrate formed according to the steps stated above.

By drilling the glass sheet according to the steps stated above, it is possible to mitigate or avoid the generation of a chip (a crack) caused in the glass sheet 1 during the drilling operation by the core drills. The reason why the glass sheet 1 is partially drilled from downward and then is drilled from upward to entirely form the portion as the inner circular hole of the doughnut-shaped glass substrate as shown in FIG. 2 and FIG. 3 is that the portion as the inner circular hole of the doughnut-shaped glass substrate can be dropped down and discharged when the blade edge 31' of the core drill 3' has entirely drilled the glass sheet 1.

Next, the glass sheet 1 fixed on the work stage 2 is moved to the third drilling machine by the conveying device. Since the third drilling machine is mounted so as to have the blade edge of the core drill directed vertically downward in order to drill the glass sheet from upward as stated above, the glass sheet 1 fixed on the work stage 2 is moved to a position just under the core drill of the third drilling machine. At this time, the shaft center of the core drill of the third drilling machine conforms to the center of the inner circular hole that has been entirely formed in the previous step.

Subsequently, the core drill 4 is moved downward, being rotated about the shaft center thereof as shown in FIG. 5. When the blade edge of the core drill is brought into contact with the glass sheet 1, the glass sheet 1 starts to be drilled. At this time, the grinding fluid is discharged from a shaft center 41 of the core drill 4 to cool a drilling area and to wash away chips caused by drilling. Since the blade edge of the core drill 4 has a diameter corresponding to the outer diameter of the doughnut-shaped glass substrate, the doughnut-shaped glass substrate starts to be separated from the glass sheet. However, it should be noted that the glass sheet 1 is entirely drilled by the blade edge of the core drill 4 at one time in this step, which is different from the above-stated steps for forming the inner circular hole. The reason is that it is difficult to drill the glass sheet 1 from both upper and lower directions in terms of the structure of the work stage 2. When the glass sheet 1 is entirely drilled at one time by the blade edge of the core drill as stated above, there is caused a problem that the glass sheet is chipped. In this step, the generation of a chip caused in the glass sheet 1 is mitigated or avoided by subjecting a portion in the vicinity of the groove 24 of the work stage 2 to backup treatment. The backup treatment means treatment, by which the glass sheet fixing surface of the work stage 2, specifically the buffer layer 21 and a portion of the body of the work stage 2 lying therebelow are both drilled by the core drill 4 to be made in the same form (shape and dimensions) as the blade edge of the core drill 4.

Since the groove 24 thus subjected to the backup treatment has the same shape and dimensions as the core drill 4, it is possible to mitigate or avoid the generation of a chip called a burr, which is caused at a drilled edge of a glass sheet when drilling the glass sheet by the core drill 4.

Although it is preferred that the buffer layer 21 serving as the backup material be inherently hard, the buffer layer should have appropriate hardness since if the buffer layer is too hard, there is a possibility that a problem is caused in terms of suction of a glass sheet.

When the blade edge at the leading edge of the core drill 4 has entirely drilled the glass sheet in this step, the doughnut-shaped glass substrate is cut out of the glass sheet 1, and the doughnut-shaped glass substrate is separated from the glass sheet 1. FIG. 6C is a view showing the doughnut-shaped glass substrate 12 and the glass sheet 1 in this stage, and FIG. 6D is a view showing the doughnut-shaped glass substrate 12.

The doughnut-shaped glass substrate 12, which has been separated from the glass sheet 1, is taken up from the work stage 2. The operation for taking up the doughnut-shaped glass substrate 12 may be manually carried out or be mechanically carried out by use of a loading system, such as a robot hand.

The reason why the drilling operation for the purpose of separating a doughnut-shaped glass substrate from the glass sheet is carried out after the drilling operation for the purpose of drilling the inner circular hole in the doughnut-shaped glass substrate is carried out in the method according to the present invention is as follows:

If the drilling operation for the purpose of separating a doughnut-shaped glass substrate from the glass sheet is carried out first, the drilling operation for the purpose of drilling the inner circular hole in the doughnut-shaped glass substrate needs to be carried out in the state shown in FIG. 6C. In this case, the doughnut-shaped glass substrate needs to be fixed on the working stage 2 only by a suction force caused on the doughnut-shaped glass substrate that has been reduced in terms of area because of being separated from the glass sheet 1, more specifically only by a suction force caused on the doughnut-shaped glass substrate 12 except for the portion serving as the inner circular hole 11. In this case, there is a possibility that the suction force caused on the doughnut-shaped glass substrate 12 is insufficient since the suction area decreases. When the suction force caused on the doughnut-shaped glass substrate 12 is insufficient, there is a possibility that when forming the inner circular hole 11, the doughnut-shaped glass substrate 12 shifts, failing to achieve desired concentricity, or an outer peripheral portion of the doughnut-shaped glass substrate 12 is damaged.

As explained above, in accordance with the method according to the present invention, the operation for drilling a glass sheet for the purpose of drilling an inner circular hole in a doughnut-shaped glass substrate, and the operation for drilling the glass sheet for the purpose of separating the doughnut-shaped glass substrate from the glass sheet are carried out by the three drilling machines, which are disposed at different positions in the glass sheet manufacturing apparatus. Accordingly, the method according to the present invention is excellent in productivity since the method according to the present invention is capable of machining a plurality of glass sheets at one time.

The entire disclosure of Japanese Patent Application No. 2005-16694 filed on Jan. 25, 2005 including specification, claims, drawings and summary is incorporated herein by reference in its entirety.

The invention claimed is:

1. A method for machining a glass sheet to manufacture a doughnut-shaped glass substrate by use of a glass substrate manufacturing apparatus, the glass substrate manufacturing apparatus including a work stage having a buffer layer thereon so as to be capable of fixing a glass sheet thereon; three drilling machines, each of the three drilling machines including a core drill; and a conveying device capable of moving the work stage, wherein the respective three drilling machines include a first drilling machine having a first core drill mounted thereon so as to direct a blade edge vertically upward, the core drill of the first drilling machine having a blade diameter corresponding to a diameter of an inner circular hole to form in a doughnut-shaped glass sheet; a second drilling machine having a core drill mounted thereon so as to direct a blade edge vertically downward, the core drill of the second drilling machine having a blade diameter corresponding to the diameter of the inner circular hole to form in the doughnut-shaped glass sheet; and a third drilling machine having a core drill mounted thereon so as to direct a blade edge vertically downward, the core drill of the third drilling machine having a blade diameter corresponding to an outer diameter of the doughnut-shaped glass sheet, and wherein the work stage has an annular groove for clearance formed therein so as to avoid contact with the blade edge of the core drill of the third drilling machine, the annular groove being formed by drilling both of the buffer layer and a portion of a body of the work stage lying therebelow by the core drill of the third drilling machine, the method comprising:

fixing a glass sheet on the work stage by a vacuum suction force given by an annular suction groove formed inside the annular groove for clearance;

after fixing the glass sheet, moving the glass sheet to a position just above the core drill of the first drilling machine by use of the conveying device;

after moving the glass sheet above the drill of the first machine, partially drilling the glass sheet from a position below the glass sheet by use of the core drill of the first drilling machine;

after drilling from below the glass sheet, moving the glass sheet to a position just under the core drill of the second drilling machine by use of the conveying device;

after moving the glass sheet under the drill of the second machine, forming the inner circular hole in the doughnut-shaped glass substrate by drilling the partially drilled portion from a position above the glass sheet by use of the core drill of the second drilling machine;

after forming the inner circular hole, moving the glass sheet to a position just under the core drill of the third drilling machine by use of the conveying device; and after moving the glass sheet under the drill of the third machine, separating the doughnut-shaped glass substrate from the glass sheet by drilling the glass sheet from a position above the glass sheet so as to insert the blade edge of the core drill of the third drilling machine into the annular groove for clearance formed in the work stage by use of the core drill of the third drilling machine.

2. The method of claim 1, further comprising:

discharging a treating substance onto a surface of the glass sheet after the glass sheet has been drilled by one or more of the first, second and third drilling machines.

* * * * *